G. T. NELSON.
STEERING MECHANISM.
APPLICATION FILED MAR. 10, 1921.
1,419,977.
Patented June 20, 1922.
2 SHEETS—SHEET 1.
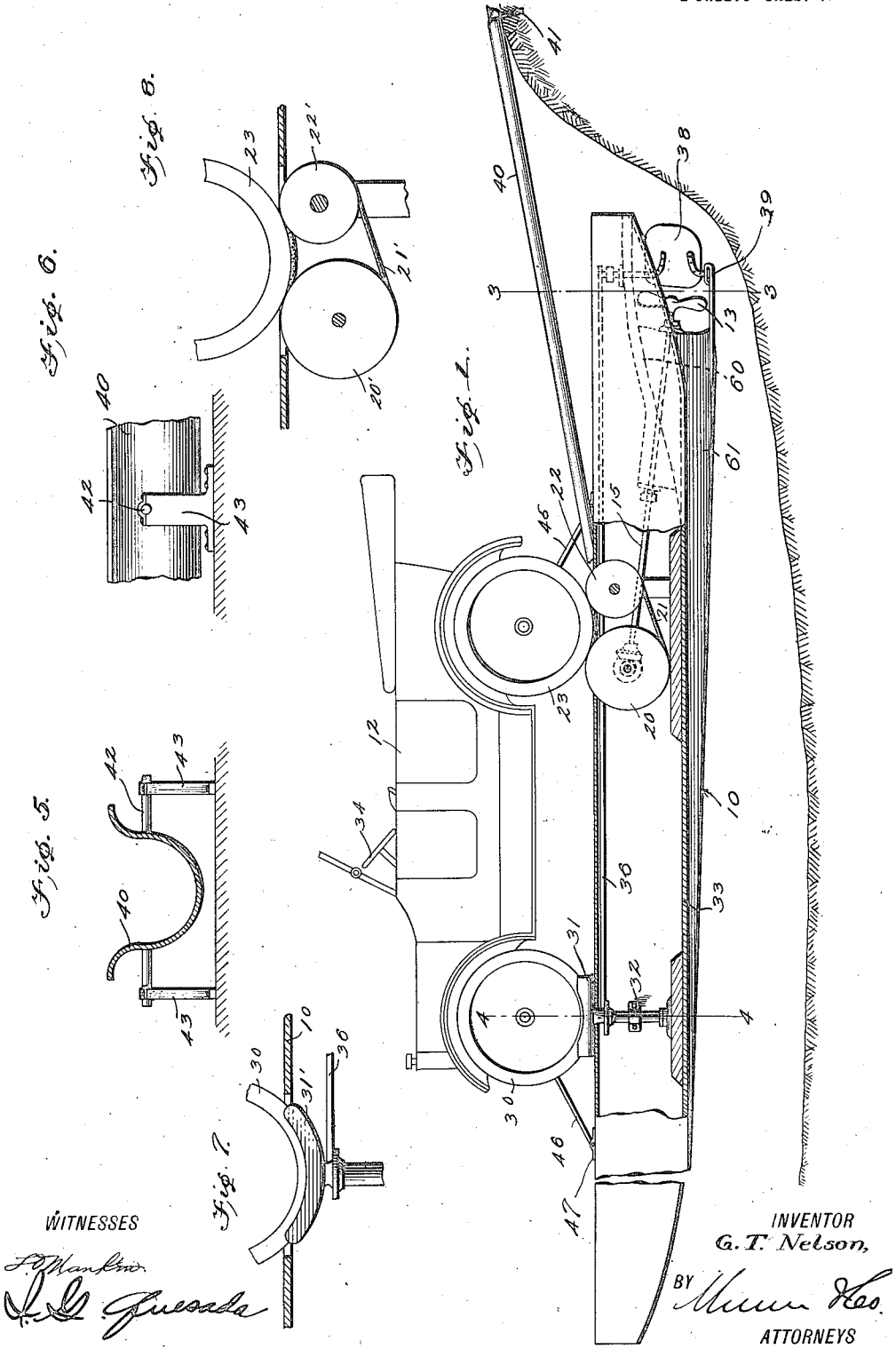
WITNESSES
INVENTOR
G. T. Nelson,
BY
ATTORNEYS G. T. NELSON.
STEERING MECHANISM.
APPLICATION FILED MAR. 10, 1921.
1,419,977.
Patented June 20, 1922.
2 SHEETS—SHEET 2.
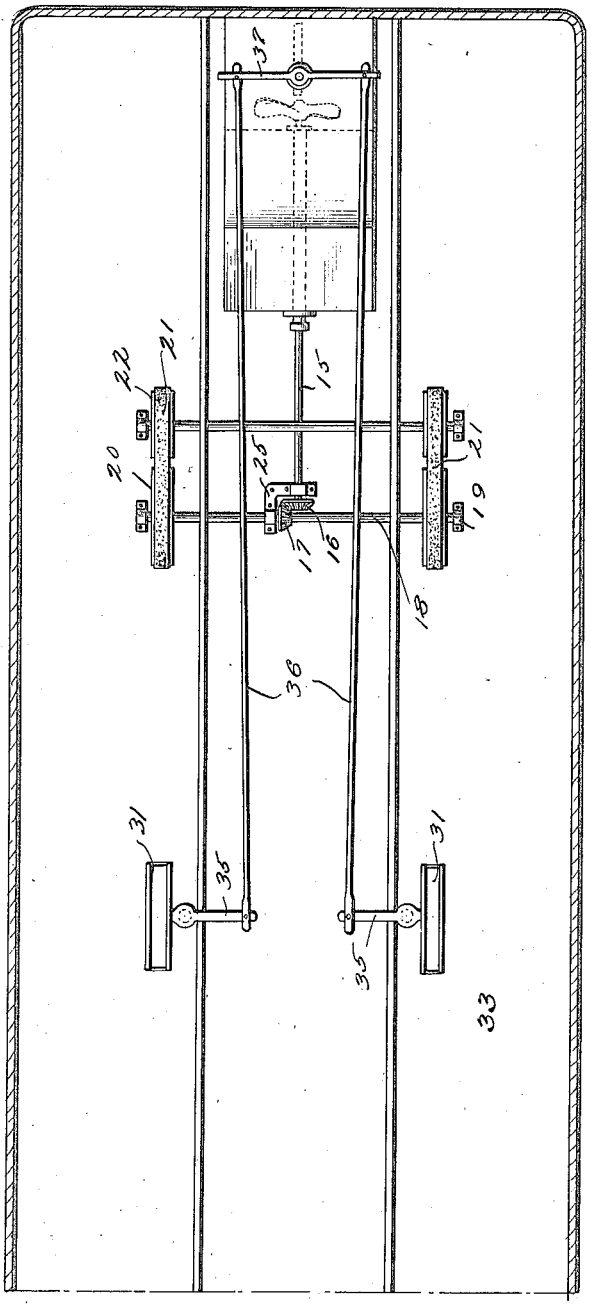
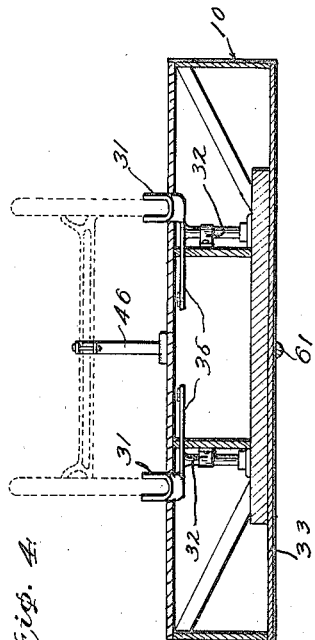
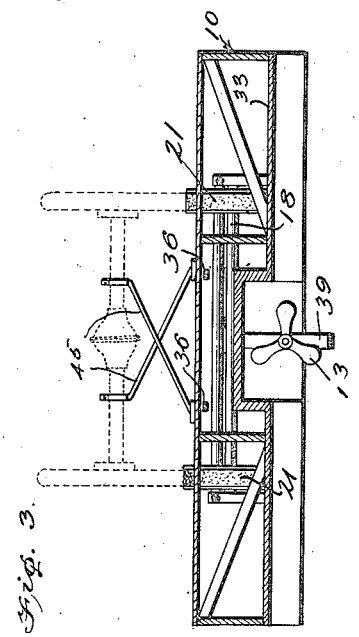
WITNESSES
INVENTOR
G. T. Nelson,
BY
ATTORNEYS

UNITED STATES PATENT OFFICE.

GUSTAF THEODOR NELSON, OF BEAUMONT, TEXAS.

STEERING MECHANISM.

1,419,977.  Specification of Letters Patent.  Patented June 20, 1922.

Application filed March 10, 1921. Serial No. 451,375.

*To all whom it may concern:*

Be it known that I, GUSTAF T. NELSON, a citizen of the United States, and a resident of Beaumont, in the county of Jefferson and State of Texas, have invented certain new and useful Improvements in Steering Mechanism, of which the following is a specification.

This invention relates to machine elements and more particularly to power transmitting devices.

Briefly stated an important aim of this invention is to provide novel means whereby the engine of a motor vehicle may be used as a source of power for propelling a pontoon or the like.

A further object of the invention is to provide simple means whereby a motor vehicle may be mounted upon a pontoon so that the power transmitted to the rear wheel may be utilized for rotating the propeller of the pontoon.

The invention forming the subject matter of this application aims also to provide novel means whereby the steering apparatus and more particularly the front wheels of the vehicle may be connected to the steering apparatus of the pontoon so that the vehicle operator may remain in his seat and exercise complete control over the pontoon.

Other objects and advantages of the invention will be apparent during the course of the following description.

In the accompanying drawings, forming a part of this application and in which like numerals are employed to designate like parts throughout the same.

Figure 1 is a side elevation of a motor vehicle mounted upon a pontoon embodied in the invention, parts of the pontoon being shown in section.

Figure 2 is a horizontal sectional view of the pontoon,

Figure 3 is a vertical transverse sectional view through the rear portion of the pontoon, the view illustrating the power transmitting means of the same, Figure 4 is a vertical transverse sectional view taken on line 4—4 of Figure 1, the view illustrating the steering means.

Figure 5 is a detail sectional view through a run-way embodied in the invention.

Figure 6 is a detail side elevation of the run-way.

Figures 7 and 8 are detail sectional views through the pontoon, the views illustrating a slightly modified form of the invention.

In the drawings wherein for the purpose of illustration is shown several preferred embodiments of the invention, the numeral 10 generally designates the pontoon which is provided with a hydro-plane or flat bottom which as is well known skids along the surface of the water when the pontoon attains a high velocity.

The invention forming the subject matter of this application resides in providing means whereby the power of the engine of the vehicle 12 may be efficiently transmitted to the propeller 13 of the pontoon so that the vehicle may be mounted on the deck of the pontoon and the engine of the same set into operation so as to propel the pontoon. As illustrated in Figures 1 and 2, a propeller shaft 15 is mounted within the pontoon and has its forward end provided with a pinion 16 which meshes with a similar pinion 17 mounted on a cross shaft 18. The cross shaft 18 which is rotatably supported by bearings 19 is provided with power transmitting wheels 20 about which belts 21 are trained. The belts 21 which are continuous are also trained about idlers 22 which may be adjusted for tightening the belts when necessary. The power from the vehicle engine is of course transmitted to the rear wheel 23 and as illustrated in Figure 1, these rear wheels are supported by the wheels 20 and 22 which are arranged adjacent each other. The forward portion of the shaft 15 is supported by an L-shaped bracket 25 which is connected to the cross shaft 18.

The front wheels 30 of the vehicle are adapted to be mounted upon shoes 31 having depending spindles passing through brackets 32 and mounted on bearings secured to the bottom 33 of the pontoon. The spindles of the shoes 31 are of course rotatable within the brackets 32 so that when the steering wheel 34 of the vehicle is rotated, the front wheels 30 will be permitted to turn either to the right or to the left.

The shoes 31 upon which the front wheels 30 are mounted are provided with inwardly extending arms 35 to which rearwardly extending links 36 are pivotally connected. With reference to Figure 2 it will be observed that the rear portions of the links 36 are connected to a teller arm 37 having connection with the rudder 38. The lower portion of the rudder is supported by the brackets 39 and is adapted to be moved either to the right or to the left for directing the pontoon.

When it is desired to mount the vehicle on the pontoon as illustrated in Figure 1, a pair of run-ways 40 may be brought into operation and the free ends of the same may be rested upon the shore of the river or upon a wharf or other landing. Suitable anchoring devices 41 are carried by the free end of the run-way and are adapted to be imbedded in the ground so as to hold the run-ways securely in position while the vehicle is being run onto the pontoon. The forward portions of the run-ways are rotatably supported by pairs of trunnions 42 which are pivotally connected to standards 43. After the vehicle is run onto the pontoon, the run-ways 40 may be disengaged with the landing, or bank, etc., and permitted to rest upon the deck of the pontoon. In this manner the run-ways may be instantly brought into operation.

When the vehicle has been positioned as illustrated in Figure 1, front and rear brackets 45 may be engaged with the front and rear portions of the vehicle so as to hold the vehicle securely in position and prevent the same from running off the pontoon. The lower portions of the rods 45 are pivotally secured to the pontoon by means of attaching members 47.

With reference to the foregoing description taken in connection with the accompanying drawings, it will be observed that an automobile may be conveniently mounted on the pontoon forming the subject matter of this application and the engine of the same may by means of the construction set forth be connected to the propeller 13 of the pontoon. The operator of the vehicle may remain in his seat and exercise complete control over the pontoon. When desired, the direction of travel of the pontoon may be changed by throwing the transmission of the vehicle into reverse gear.

As illustrated in Figures 1 and 3, the rear portion of the bottom 33 curves upwardly as indicated at 60 so as to form a churning space within which the propeller 13 is arranged. By reason of inclining the stern portion of the bottom 33 upwardly the propeller may be located comparatively near the surface of the water. By reason of this construction the propeller is permitted to operate in extremely shallow water. It will be noted that the keel 61 extends below the plane of the propeller so as to constitute a guard for the same, whereby the propeller is prevented from striking rocks or other submerged obstacles.

In the form of the invention illustrated in Figure 7 the arcuate shoes designated by the numeral 31' are seated in recesses in the deck of the pontoon. The upper ends of the shoes 31' are flush with the surface of the deck so that the wheels may freely ride into the shoes.

In the form of the invention illustrated in Figure 8 it will be observed that the wheels 20' and 22' may be also imbedded in the deck of the pontoon so that the upper portions of the same will be approximately flush with the deck of the pontoon. It will be noted that the arrangement facilitates the positioning of motor vehicles on the pontoon and permits of the ready removal of the same.

Suitable means may be employed for securely connecting the bar 46 to the front axle and for adjusting the length of the same.

As particularly illustrated in Figure 4 the shoes 31 are arranged outwardly of the planes of the spindles and the spindles are arranged approximately in the planes of the king bolts of the front wheel. As is well known the wheels of the vehicle upon being turned either to the right or to the left turn about the axes of the king bolts and not about an axis passing through the wheels. Therefore, the shoes 31 are arranged outwardly of the spindles.

Having thus fully described my invention what I claim as new and desire to secure by Letters Patent is—

1. A pontoon comprising a hull, bearings carried thereby, vertically arranged spindles rotatably mounted on said bearings, horizontal arms connected intermediate their ends to the upper portions of said spindles and extended beyond the sides of the same for substantial distances, shoes carried by the outer ends of said arms at points spaced outwardly of the planes of said spindles, said shoes being adapted to be engaged by the front wheels of the motor vehicle, whereby the king bolts of the front wheels are disposed in alignment with said spindles.

2. A pontoon comprising a hull, bearings carried by the hull, vertical spindles rotatably carried by said bearings, horizontal arms connected to said spindles and extending beyond the sides of the same for substantial distances, shoes carried by the outer ends of said arms at points spaced outwardly of said spindles, said shoes being adapted to be engaged by the front wheels of the motor vehicle, whereby the king bolts of the front wheels of the vehicle are disposed in alignment with said spindles, and brackets rotatably receiving said spindles.

GUSTAF THEODOR NELSON.